US011967156B2

(12) United States Patent
Hao et al.

(10) Patent No.: US 11,967,156 B2
(45) Date of Patent: Apr. 23, 2024

(54) ROAD RECOGNITION METHOD AND SYSTEM BASED ON SEED POINT

(71) Applicant: Nanjing University of Aeronautics and Astronautics, Nanjing (CN)

(72) Inventors: Jie Hao, Nanjing (CN); Lei Zhang, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 638 days.

(21) Appl. No.: 17/145,193

(22) Filed: Jan. 8, 2021

(65) Prior Publication Data

US 2022/0092314 A1 Mar. 24, 2022

(30) Foreign Application Priority Data

Sep. 21, 2020 (CN) .......................... 202010993482.0

(51) Int. Cl.
*G06T 7/73* (2017.01)
*B64D 47/08* (2006.01)
(Continued)

(52) U.S. Cl.
CPC ............ *G06V 20/56* (2022.01); *G06F 16/535* (2019.01); *G06F 16/55* (2019.01); *G06N 20/00* (2019.01); *G06V 10/25* (2022.01); *G06V 10/30* (2022.01)

(58) Field of Classification Search
CPC ........ G06V 20/56; G06V 10/25; G06V 10/30; G06V 20/588; G06F 16/535; G06F 16/55;
(Continued)

(56) References Cited

U.S. PATENT DOCUMENTS 7,760,914 B2 * 7/2010 Santamaria ............... G06T 7/12
382/199
8,938,094 B1 * 1/2015 Kehl ..................... G06T 11/203
348/148
(Continued)

OTHER PUBLICATIONS

Regis Bonnefon, Pierre Dherete, Jacky Desachy, "Automatic tracking of linear features on SPOT images using dynamic programming," Proc. SPIE 3871, Image and Signal Processing for Remote Sensing V, (Dec. 14, 1999); https://doi.org/10.1117/12.373249 (Year: 1999).*

*Primary Examiner* — Ross Varndell
*Assistant Examiner* — Andrew B. Jones
(74) *Attorney, Agent, or Firm* — Welsh Flaxman & Gitler LLC

(57) ABSTRACT

A road recognition method and system based on a seed point includes: obtaining a remote sensing image; obtaining a grayscale image; inserting a seed point in the grayscale image; searching for four initial road boundary points using the seed point as a reference point; obtaining a smallest bounding rectangle search box formed by the four initial road boundary points; obtaining a plurality of candidate search boxes based on the obtained search boxes; determining whether a sum of squares of grayscale differences between the plurality of candidate search boxes and the obtained search box is greater than a preset threshold; and if yes, stopping searching and completing road recognition; or if not, selecting a new search box from the plurality of candidate search boxes, and retrieving a plurality of candidate search boxes based on the new search box.

6 Claims, 5 Drawing Sheets

(51) Int. Cl.
*G06F 16/535* (2019.01)
*G06F 16/55* (2019.01)
*G06N 20/00* (2019.01)
*G06T 7/12* (2017.01)
*G06T 7/149* (2017.01)
*G06T 17/00* (2006.01)
*G06V 10/25* (2022.01)
*G06V 10/30* (2022.01)
*G06V 20/56* (2022.01)
*G06V 20/64* (2022.01)

(58) Field of Classification Search
CPC ....... G06F 16/583; G06N 20/00; G06T 5/002; G06T 7/136; G06T 2207/10032
See application file for complete search history.

(56) References Cited

U.S. PATENT DOCUMENTS 10,313,574 B2 * 6/2019 Hanel ................. G06V 10/803
11,029,150 B2 * 6/2021 Sasamoto ............ G06V 20/588

* cited by examiner

ROAD RECOGNITION METHOD AND SYSTEM BASED ON SEED POINT

RELATED PATENT DATA

This application claims priority to CN Patent Application No. 202010993482.0, which was filed Sep. 21, 2020, the teachings of which are incorporated herein by reference.

TECHNICAL FIELD

The present disclosure relates to the technical field of road recognition, in particular to a road recognition method and system based on a seed point.

BACKGROUND

A remote sensing image is a most intuitive and richest carrier for detecting comprehensive information of a ground object. Road information in the remote sensing image has very high application value in fields of digital mapping, image understanding and positioning, geographic information system update, and the like. In past ten years, extracting a road from a satellite image has been a research hotspot. Road extraction can be used in automatic crisis response, route map update, city planning, geographic information update, car navigation, and the like. Various methods have been proposed in recent years to extract a road from a satellite image, such as a template matching method, an edge and parallel line method, a model method, and a filtering method. There are also some fully automatic extracting methods such as a deep learning method (a semantic segmentation method).

A remote sensing image semantic segmentation method is to automatically extract and learn a feature of a road based on deep learning to obtain semantic information, and then extract the road. In the method, network structures such as U-Net and D-LinkNet are used, and the method is suitable for road detection with extremely high resolution and very large data sets. However, this method is not sensitive to edge information of the road, and an extraction effect of continuous large-area occlusion is not very good. This may cause an uneven road edge and a road break.

Research shows that an interactive semi-automatic road extraction method is currently a most widely used in road extraction. This road extraction method can relatively well extract a rural road from a clear remote sensing image with sparse roads and a simple background. For example, an extracted road is relatively effective according to a template matching method and a Snakes model method. A road usually has the following characteristics: geometric characteristics including that the road is a long strip, a width of a section of the road remains basically unchanged, and a curvature of the road is limited; radiation characteristics including that road areas have similar gray values and similar texture features, and there is a relatively obvious contrast between the road and a surrounding ground object; and contextual information including that a place having a road monitoring camera must be a road, a current road monitoring position is relatively easy to obtain, and using the road as a seed point can ensure effectiveness of road extraction. However, both the template matching method and the Snakes model method require complicated initialization. If deviation of an initial seed point or a template position is relatively large, reset is required.

For a method based on a parallel line and filtering by using an interactive semi-automatic extraction algorithm, because on an urban road, a road edge is severely occluded, and there are many vehicles on the road, this may lead to low extraction accuracy, and is prone to salt-and-pepper phenomenon, and an effect of road extraction is not ideal.

SUMMARY

The present disclosure aims to provide a road recognition method and system based on a seed point, without repeatedly resetting the seed point or a rectangular template. According to the present disclosure, an edge of a searched road is smooth, and there is no salt-and-pepper phenomenon.

To achieve the above objective, the present disclosure provides the following solutions:

A road recognition method based on a seed point, including:
  obtaining a remote sensing image;
  preprocessing the remote sensing image to obtain a grayscale image;
  inserting a seed point in the grayscale image, where the seed point is a monitoring location point in a road to be identified;
  searching for four initial road boundary points using the seed point as a reference point;
  obtaining a smallest bounding rectangle search box formed by the four initial road boundary points;
  rotating the obtained search box at different angles, and moving rotated search boxes to obtain a plurality of candidate search boxes;
  determining whether a sum of squares of grayscale differences between the plurality of candidate search boxes and the obtained search box is greater than a preset threshold; and
  if yes, stopping searching and completing road recognition; or
  if not, selecting a new search box from the plurality of candidate search boxes, and retrieving a plurality of candidate search boxes based on the new search box.

Optionally, the searching for four initial road boundary points using the seed point as a reference point is specifically:
  separately searching for pixels in $\alpha°$ direction and $(\alpha+180°)$ direction of the seed point;
  determining whether a gray value difference between a current searched pixel and a previous pixel is greater than a preset threshold; and
  if yes, using the current pixel as one initial road boundary point, and then changing the search direction with the seed point as the reference point to continue searching for a pixel; or
  if not, directly changing the search direction with the seed point as the reference point to continue searching for a pixel.

Optionally, search directions obtained after changing are $(\alpha+45°)$ and $(\alpha+225°)$, $(\alpha+90°)$ and $(\alpha+270°)$, and $(\alpha+135°)$ and $(\alpha+315°)$.

Optionally, the rotating the obtained search box at different angles, and moving rotated search boxes to obtain a plurality of candidate search boxes is specifically:
  rotating the obtained search box with a center point of the obtained search box as a center, and advancing the rotated search box by a side length of the obtained search box to obtain a plurality of candidate search boxes advanced at different rotation angles.

Optionally, the selecting a new search box from the plurality of candidate search boxes is specifically:

selecting a candidate search box from the plurality of candidate search boxes as a new search box, where a sum of squares of grayscale differences between the candidate search box and the obtained search box is smallest.

Optionally, a search step value for searching the four initial road boundary points is one pixel, and a search range is 10 pixels.

Optionally, the preprocessing the remote sensing image to obtain a grayscale image is specifically:

performing geometric correction, radiometric calibration, and graying on the remote sensing image to obtain the grayscale image.

A road recognition system based on a seed point, including:

an image obtaining module, configured to obtain a remote sensing image;

an image preprocessing module, configured to preprocess the remote sensing image to obtain a grayscale image;

a seed point insertion module, configured to insert a seed point in the grayscale image, where the seed point is a monitoring location point in a road to be identified;

a search module, configured to search for four initial road boundary points using the seed point as a reference point;

a rectangular search box obtaining module, configured to obtain a smallest bounding rectangle search box formed by the four initial road boundary points;

a first candidate search box obtaining module, configured to rotate the obtained search box at different angles, and move rotated search boxes to obtain a plurality of candidate search boxes;

a determining module, configured to determine whether a sum of squares of grayscale differences between the plurality of candidate search boxes and the obtained search box is greater than a preset threshold;

a road recognition module, configured to stop searching and complete road recognition when the sum of the squares of the grayscale differences between the plurality of candidate search boxes and the obtained search boxes is greater than the preset threshold; and a second candidate search box obtaining module, configured to select a new search box from the plurality of candidate search boxes when the sum of the squares of the grayscale differences between the plurality of candidate search boxes and the obtained search boxes is not greater than the preset threshold, and retrieve a plurality of candidate search boxes based on the new search box.

Optionally, the search module includes:

a first searching unit, configured to separately search for pixels in $\alpha°$ direction and $(\alpha+180°)$ direction of the seed point;

a determining unit, configured to determine whether a gray value difference between a current searched pixel and a previous pixel is greater than a preset threshold;

a second searching unit, configured to use the current pixel as one initial road boundary point when the gray value difference between the current searched pixel and the previous pixel is greater than the preset threshold, and then change the search direction with the seed point as the reference point to continue searching for a pixel; and a third searching unit, configured to directly change the search direction with the seed point as the reference point to continue searching for a pixel when the gray value difference between the current searched pixel and the previous pixel is less than or equal to the preset threshold.

Optionally, the first candidate search box obtaining module includes:

a rotating unit, configured to rotate the obtained search box with a center point of the obtained search box as a center; and a candidate search box obtaining unit, configured to advance the rotated search box by a side length of the obtained search box to obtain candidate search boxes advanced at different rotation angles.

According to embodiments of the present disclosure, the present disclosure has the following technical effects.

The present disclosure discloses a road recognition method based on a seed point, including: obtaining a remote sensing image; preprocessing the remote sensing image to obtain a grayscale image; inserting a seed point in the grayscale image, where the seed point is a monitoring location point in a road to be identified; searching for four initial road boundary points using the seed point as a reference point; obtaining a smallest bounding rectangle search box formed by the four initial road boundary points; rotating the obtained search box at different angles, and moving the rotated search box to obtain a plurality of candidate search boxes; determining whether a sum of squares of grayscale differences between the plurality of candidate search boxes and the obtained search box is greater than a preset threshold; and if yes, stopping searching and completing road recognition; or if not, selecting a new search box from the plurality of candidate search boxes, and retrieving a plurality of candidate search boxes based on the new search box. According to the present disclosure, a plurality of new search boxes can be generated based on the seed point (a monitoring location point), without repeatedly resetting the seed point or the search box. An entire road network is searched based on the plurality of new search boxes, so that an edge of a searched road is smooth, and there is no salt-and-pepper phenomenon.

BRIEF DESCRIPTION OF DRAWINGS

In order to illustrate the embodiments of the present disclosure or the technical solutions of the prior art, the accompanying drawing to be used will be described briefly below. Notably, the following accompanying drawing merely illustrates some embodiments of the present disclosure, but other accompanying drawings can also be obtained those of ordinary skill in the art based on the accompanying drawing without any creative efforts.

DETAILED DESCRIPTION

The following clearly and completely describes the technical solutions in the embodiments of the present disclosure with reference to accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure aims to provide a road recognition method and system based on a seed point, without repeatedly resetting the seed point or a rectangular template. According to the present disclosure, an edge of a searched road is smooth, and there is no salt-and-pepper phenomenon.

To make the foregoing objective, features, and advantages of the present disclosure clearer and more comprehensible, the present disclosure is further described in detail below with reference to the accompanying drawings and specific embodiments.

Embodiment 1

Figure 1:
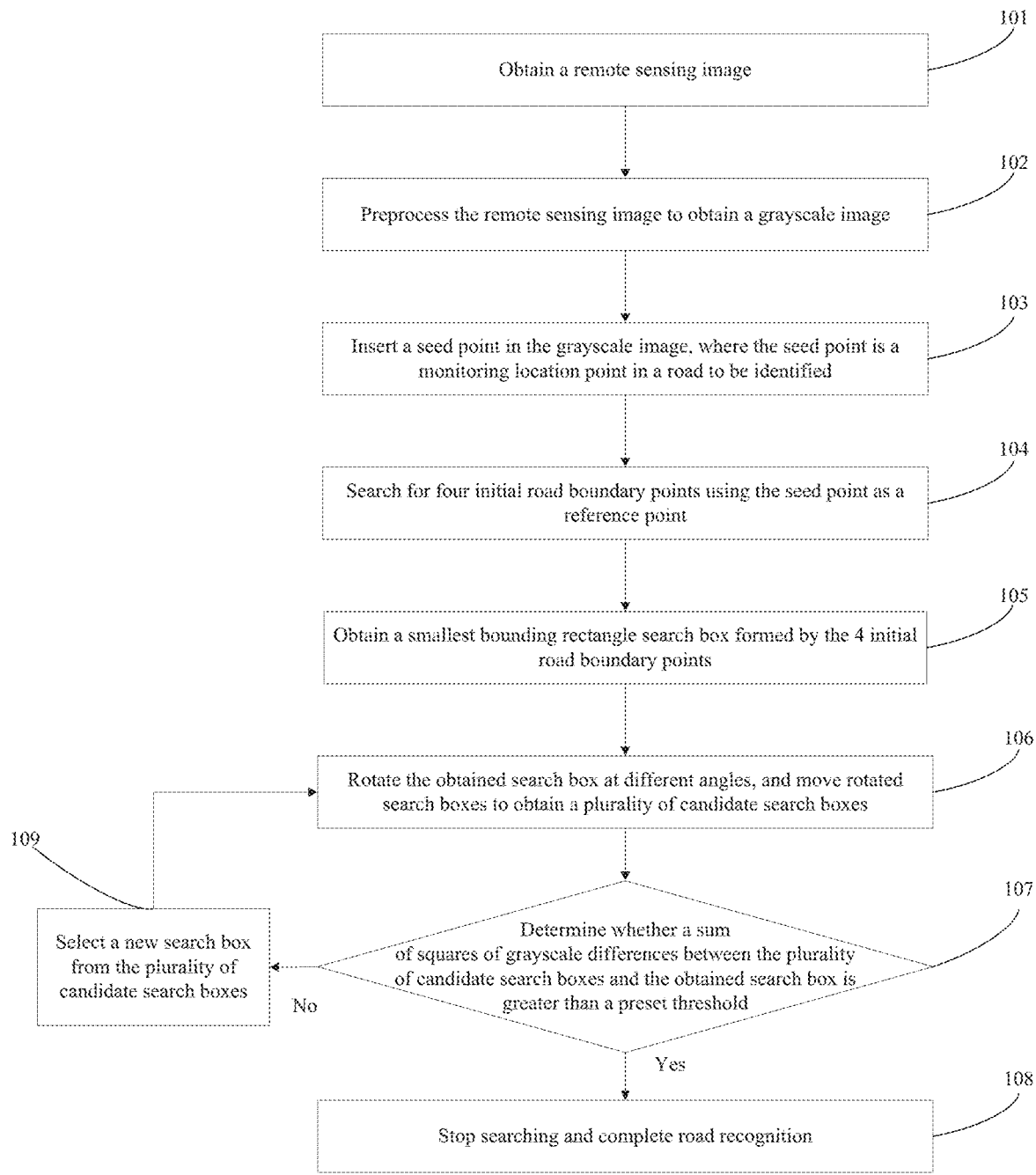
FIG. 1 is a flowchart of a road recognition method based on a seed point according to an embodiment of the present disclosure.

FIG. 1 is a flowchart of a road recognition method based on a seed point according to an embodiment of the present disclosure. As shown in FIG. 1, the method includes the following steps.

Step 101: Obtain a remote sensing image. Preferably, the remote sensing image is a high-resolution image.

Step 102: Preprocess the remote sensing image to obtain a grayscale image. Specifically, geometric correction, radiometric calibration, and graying are performed on the remote sensing image to obtain the grayscale image.

Step 103: Insert a seed point in the grayscale image, where the seed point is a monitoring location point in a road to be identified.

Step 104: Search for four initial road boundary points using the seed point as a reference point.

In this embodiment, step 104 is specifically:

Separately search for pixels in $\alpha°$ direction and $(\alpha+180°)$ direction of the seed point. Preferably, $\alpha°=0°$, a search step value is one pixel, and a search range is 10 pixels.

Determine whether a gray value difference between a current searched pixel and a previous pixel is greater than a preset threshold.

If yes, use the current pixel as one initial road boundary point, and then change the search direction with the seed point as the reference point to continue searching for a pixel; or if not, directly change the search direction with the seed point as the reference point to continue searching for a pixel, until the four initial road boundary points are found.

Preferably, search directions obtained after changing are $(\alpha+45°)$ and $(\alpha+225°)$, $(\alpha+90°)$ and $(\alpha+270°)$, and $(\alpha+135°)$ and $(\alpha+315°)$.

Figure 2:
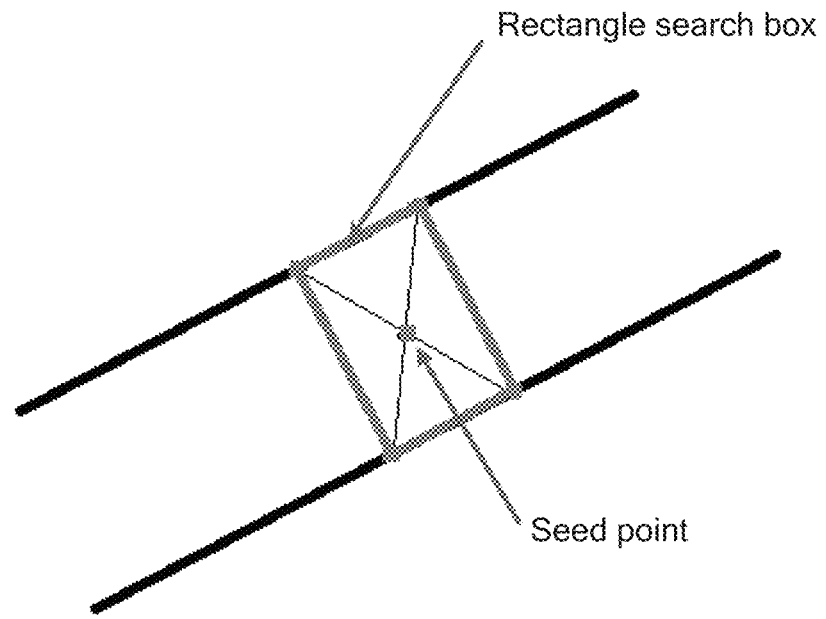
FIG. 2 is a schematic diagram of obtaining a smallest bounding rectangle search box according to an embodiment of the present disclosure.

Step 105: Obtain a smallest bounding rectangle search box formed by the four initial road boundary points. FIG. 2 is a schematic diagram of obtaining a smallest bounding rectangle search box according to an embodiment of the present disclosure.

Step 106: Rotate the obtained search box at different angles, and move rotated search boxes to obtain a plurality of candidate search boxes.

Figure 3:
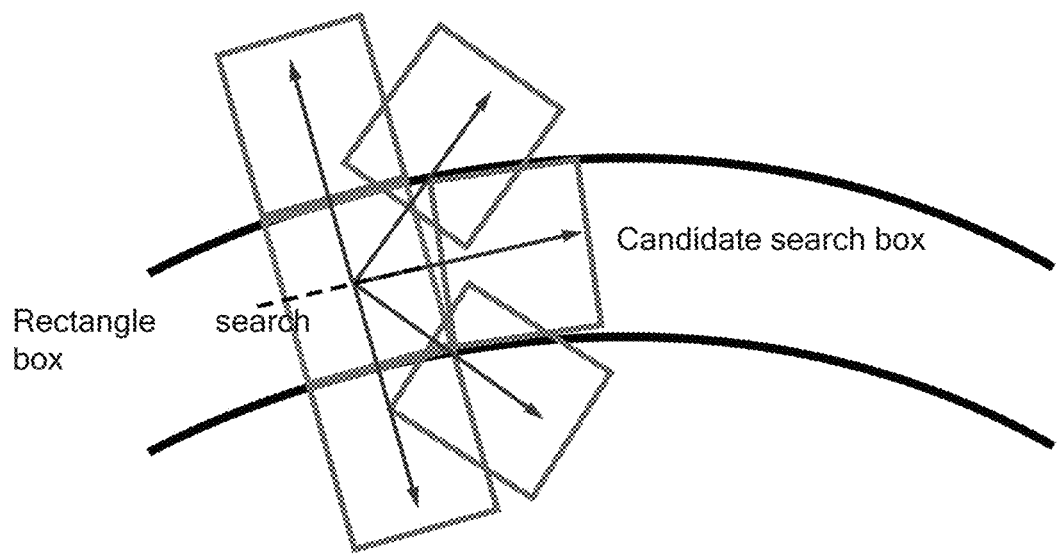
FIG. 3 is a schematic diagram of obtaining a candidate search box according to an embodiment of the present disclosure.

In this embodiment, step 106 is specifically:

Rotate the obtained search box with a center point of the obtained search box as a center, and advance the rotated search box by a side length of the obtained search box to obtain a plurality of candidate search boxes advanced at different rotation angles. FIG. 3 is a schematic diagram of obtaining a candidate search box according to an embodiment of the present disclosure.

Step 107: Determine whether a sum of squares of grayscale differences between the plurality of candidate search boxes and the obtained search box is greater than a preset threshold.

Step 108: If yes, stop searching and complete road recognition.

Figure 4:
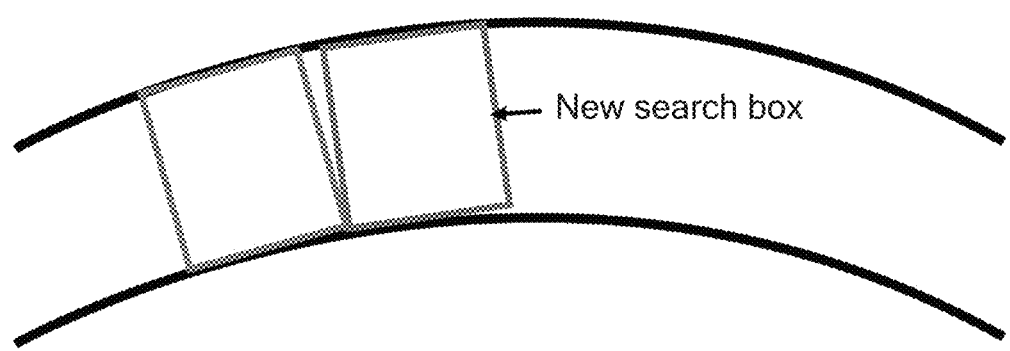
FIG. 4 is a schematic diagram of obtaining a new search box according to an embodiment of the present disclosure.

Step 109: If not, select a new search box from the plurality of candidate search boxes, and retrieve a plurality of candidate search boxes based on the new search box. In this embodiment, selecting a new search box is specifically: selecting a candidate search box from the plurality of candidate search boxes as the new search box, where a sum of squares of grayscale differences between the candidate search box and the obtained search box is smallest. FIG. 4 is a schematic diagram of obtaining a new search box according to an embodiment of the present disclosure.

Embodiment 2

Figure 6:
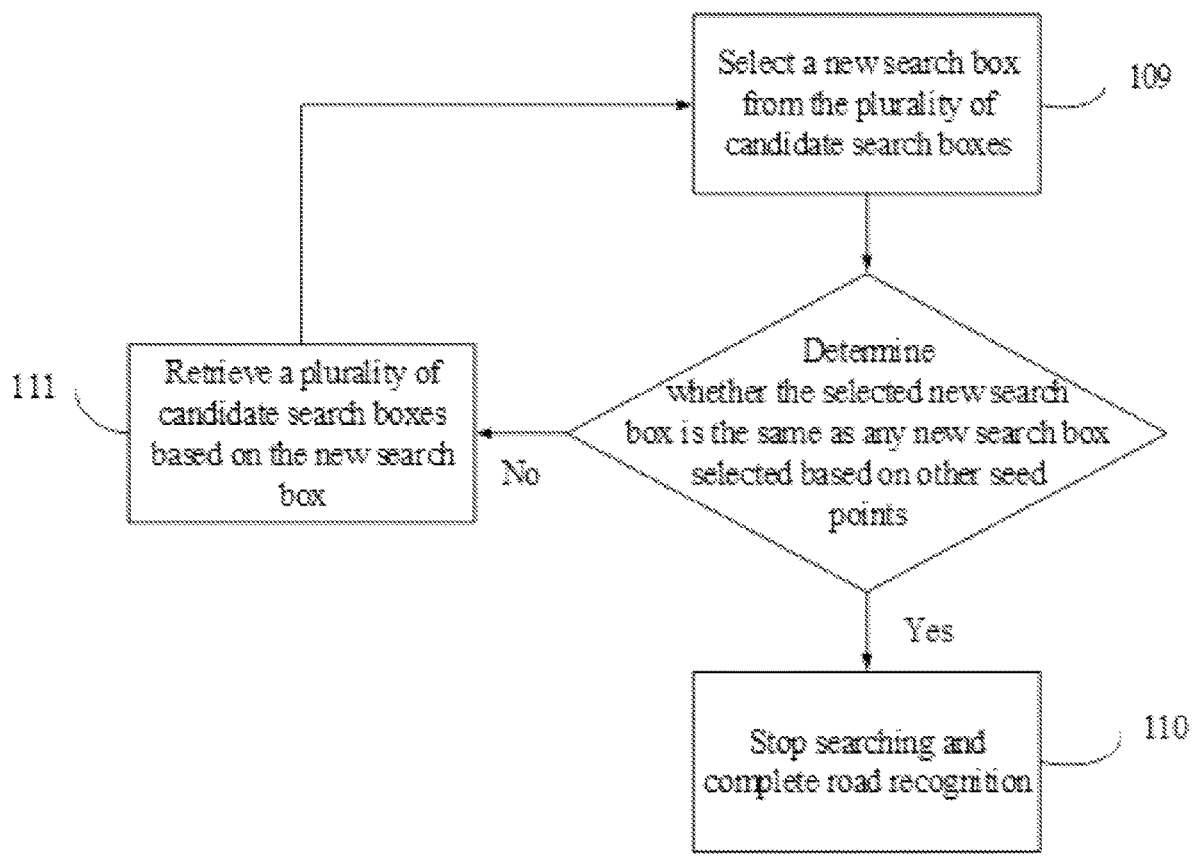
FIG. 6 is a flowchart of another road recognition method based on a seed point according to an embodiment of the present disclosure.

This embodiment provides a road recognition method based on a seed point. A difference from Embodiment 1 is that in this embodiment, a plurality of seed points are inserted, and steps 104 to 108 are performed with each seed point as a reference point. Meanwhile, as shown in FIG. 6, the method in this embodiment further includes the following steps:

Step 109: Select a new search box from the plurality of candidate search boxes if the sum of the squares of the grayscale differences between the plurality of candidate search boxes and the obtained search boxes is not greater than the preset threshold, and determine whether the selected new search box is the same as any new search box selected based on other seed points.

Step 110: If yes, stop searching and complete road recognition.

Step 111: If not, retrieve a plurality of candidate search boxes based on the new search box.

Embodiment 3

Figure 5:
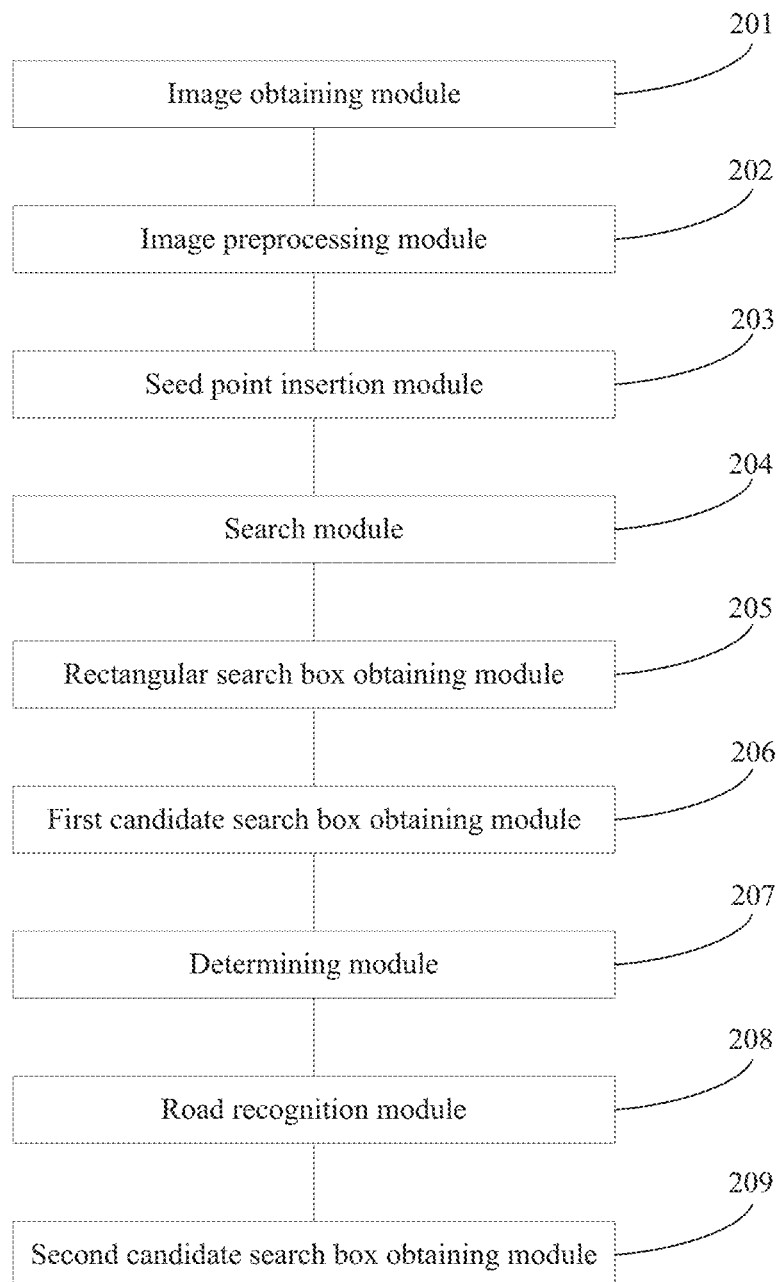
FIG. 5 is a system diagram of a road recognition system based on a seed point according to an embodiment of the present disclosure.

FIG. 5 is a system diagram of a road recognition system based on a seed point according to an embodiment of the present disclosure. As shown in FIG. 5, the system includes:

- an image obtaining module 201, configured to obtain a remote sensing image;
- an image preprocessing module 202, configured to preprocess the remote sensing image to obtain a grayscale image;
- a seed point insertion module 203, configured to insert a seed point in the grayscale image, where the seed point is a monitoring location point in a road to be identified; and
- a search module 204, configured to search for four initial road boundary points using the seed point as a reference point.

In this embodiment, the search module 204 includes:

a first searching unit, configured to separately search for pixels in α° direction and (α+180°) direction of the seed point;

a determining unit, configured to determine whether a gray value difference between a current searched pixel and a previous pixel is greater than a preset threshold;

a second searching unit, configured to use the current pixel as one initial road boundary point when the gray value difference between the current searched pixel and the previous pixel is greater than the preset threshold, and then change the search direction with the seed point as the reference point to continue searching for a pixel; and a third searching unit, configured to directly change the search direction with the seed point as the reference point to continue searching for a pixel when the gray value difference between the current searched pixel and the previous pixel is less than or equal to the preset threshold.

The system further includes: a rectangular search box obtaining module 205, configured to obtain a smallest bounding rectangle search box formed by the four initial road boundary points; and a first candidate search box obtaining module 206, configured to rotate the obtained search box at different angles, and move rotated search boxes to obtain a plurality of candidate search boxes.

In this embodiment, the first candidate search box obtaining module 206 includes:

a rotating unit, configured to rotate the obtained search box with a center point of the obtained search box as a center; and a candidate search box obtaining unit, configured to advance the rotated search box by a side length of the obtained search box to obtain candidate search boxes advanced at different rotation angles.

The system further includes: a determining module 207, configured to determine whether a sum of squares of grayscale differences between the plurality of candidate search boxes and the obtained search box is greater than a preset threshold;

a road recognition module 208, configured to stop searching and complete road recognition when the sum of the squares of the grayscale differences between the plurality of candidate search boxes and the obtained search boxes is greater than the preset threshold; and a second candidate search box obtaining module 209, configured to select a new search box from the plurality of candidate search boxes when the sum of the squares of the grayscale differences between the plurality of candidate search boxes and the obtained search boxes is not greater than the preset threshold, and retrieve a plurality of candidate search boxes based on the new search box.

According to specific embodiments of the present disclosure, the present disclosure has the following technical effects.

According to the present disclosure, a plurality of new search boxes can be generated based on the seed point (a monitoring location point), without repeatedly resetting the seed point or repeatedly resetting the search box. An entire road network is searched based on the plurality of new search boxes, so that an edge of a searched road is smooth, and there is no salt-and-pepper phenomenon.

Each embodiment of the present specification is described in a progressive manner, each embodiment focuses on the difference from other embodiments, and the same and similar parts between the embodiments may refer to each other. For a system disclosed in the embodiments, since the system corresponds to the method disclosed in the embodiments, the description is relatively simple, and reference can be made to the method description.

In this specification, several specific embodiments are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and scope of application in accordance with the ideas of the present disclosure. In conclusion, the content of this specification shall not be construed as a limitation to the present disclosure.

The invention claimed is:

1. A road recognition method based on a seed point, comprising:

obtaining a remote sensing image;

preprocessing the remote sensing image to obtain a grayscale image;

inserting a seed point in the grayscale image, wherein the seed point is a monitoring location point in a road to be identified;

searching for four initial road boundary points using the seed point as a reference point, comprising:
  separately searching for pixels in α° direction and (α+180°) direction of the seed point;
  determining whether a gray value difference between a current searched pixel and a previous pixel is greater than a preset threshold; and
  if yes, using the current pixel as one initial road boundary point, and then changing the search direction with the seed point as the reference point to continue searching for a pixel; or
  if not, directly changing the search direction with the seed point as the reference point to continue searching for a pixel;

obtaining a smallest bounding rectangle search box formed by the four initial road boundary points;

rotating the obtained search box at different angles, and moving rotated search boxes to obtain a plurality of candidate search boxes;

determining whether a sum of squares of grayscale differences between the plurality of candidate search boxes and the obtained search box is greater than a preset threshold;

recognizing the edge of the road when the sum of the squares of the grayscale differences between the plurality of candidate search boxes and the obtained search box is greater than the preset threshold;

when the sum of the squares of the grayscale differences between the plurality of candidate search boxes and the obtained search box is not greater than the preset threshold, selecting a new search box from the plurality of candidate search boxes, retrieving a plurality of further candidate search boxes based on the new search box; and recognizing the edge of the road when the sum of the squares of the grayscale differences between the plurality of further candidate search boxes and the new search box is greater than the preset threshold.

2. The road recognition method according to claim 1, wherein search directions obtained after changing are (α+45°) and (α+225°), (α+90°) and (α+270°), and (α+135°) and (α+315°).

3. The road recognition method according to claim 1, wherein the rotating the obtained search box at different angles, and moving rotated search boxes to obtain a plurality of candidate search boxes is specifically:

rotating the obtained search box with a center point of the obtained search box as a center, and advancing the rotated search box by a side length of the obtained search box to obtain a plurality of candidate search boxes advanced at different rotation angles.

4. The road recognition method according to claim 1, wherein the selecting a new search box from the plurality of candidate search boxes is specifically:

selecting a candidate search box from the plurality of candidate search boxes as a new search box, wherein a sum of squares of grayscale differences between the candidate search box and the obtained search box is smallest.

5. The road recognition method according to claim 1, wherein a search step value for searching the four initial road boundary points is one pixel, and a search range is 10 pixels.

6. The road recognition method of claim 1, wherein the preprocessing the remote sensing image to obtain a grayscale image is specifically:

performing geometric correction, radiometric calibration, and graying on the remote sensing image to obtain the grayscale image.

\* \* \* \* \*